United States Patent

[11] 3,584,650

| [72] | Inventor | Donald G. Macaulay<br>Ypsilanti, Mich. |
|---|---|---|
| [21] | Appl. No. | 769,510 |
| [22] | Filed | Oct. 22, 1968 |
| [45] | Patented | June 15, 1971 |
| [73] | Assignee | RCA Corporation |

[54] REED ARMATURE VALVES FOR CONTROLLING FLUID FLOW
8 Claims, 6 Drawing Figs.

[52] U.S. Cl. ................................................. 137/625.65,
 251/129, 251/139, 137/625.44, 91/47
[51] Int. Cl. .......................................... F16k 31/06
[50] Field of Search .......................................... 251/139,
 303, 129; 137/625.44, 625.65

[56] References Cited
UNITED STATES PATENTS

| 1,734,304 | 11/1929 | Saalbach ...................... | 251/303 X |
| 1,282,275 | 10/1918 | Morris ......................... | 251/129 X |
| 1,957,585 | 5/1924 | Gratian ....................... | 251/129 X |
| 2,846,181 | 8/1958 | Orelind et al. ............... | 251/303 X |
| 3,215,162 | 11/1965 | Carver ........................ | 137/625.44 |

*Primary Examiner*—Arnold Rosenthal
*Attorney*—Edward J. Norton

ABSTRACT: A valve is disclosed in which a magnetic reed of flat springlike configuration closes an orifice in a plate by lying against a flat surface of the plate that has the orifice therein. A magnetic field applied to the reed causes the end of the reed to flex away from the flat surface with a peeling action to open the first mentioned orifice and to flex the reed to a second position in which it may close a second orifice.

PATENTED JUN 15 1971
3,584,650
SHEET 1 OF 2
Fig.1.
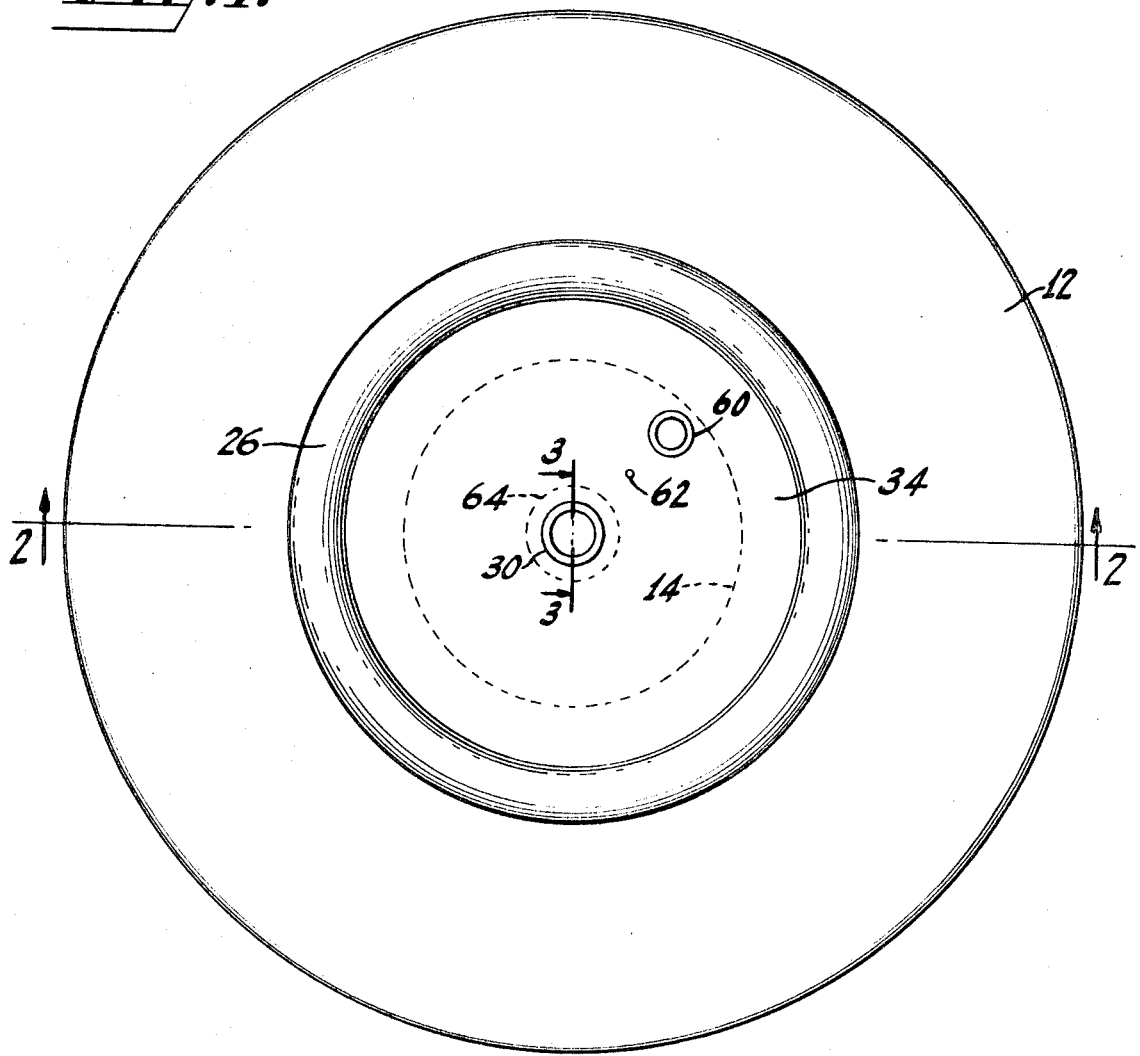
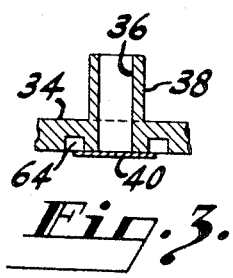
Fig.3.
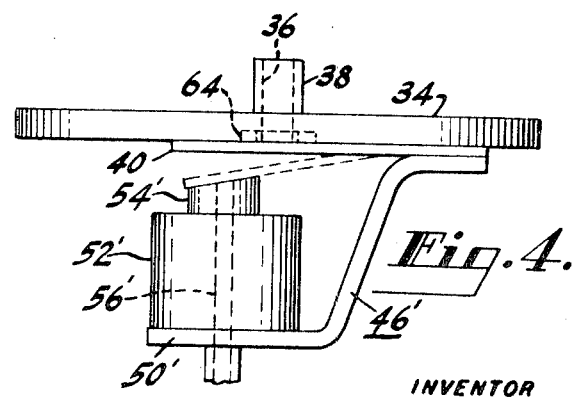
Fig.4.
INVENTOR
DONALD G. MACAULAY
BY Simon Yaffee
ATTORNEY

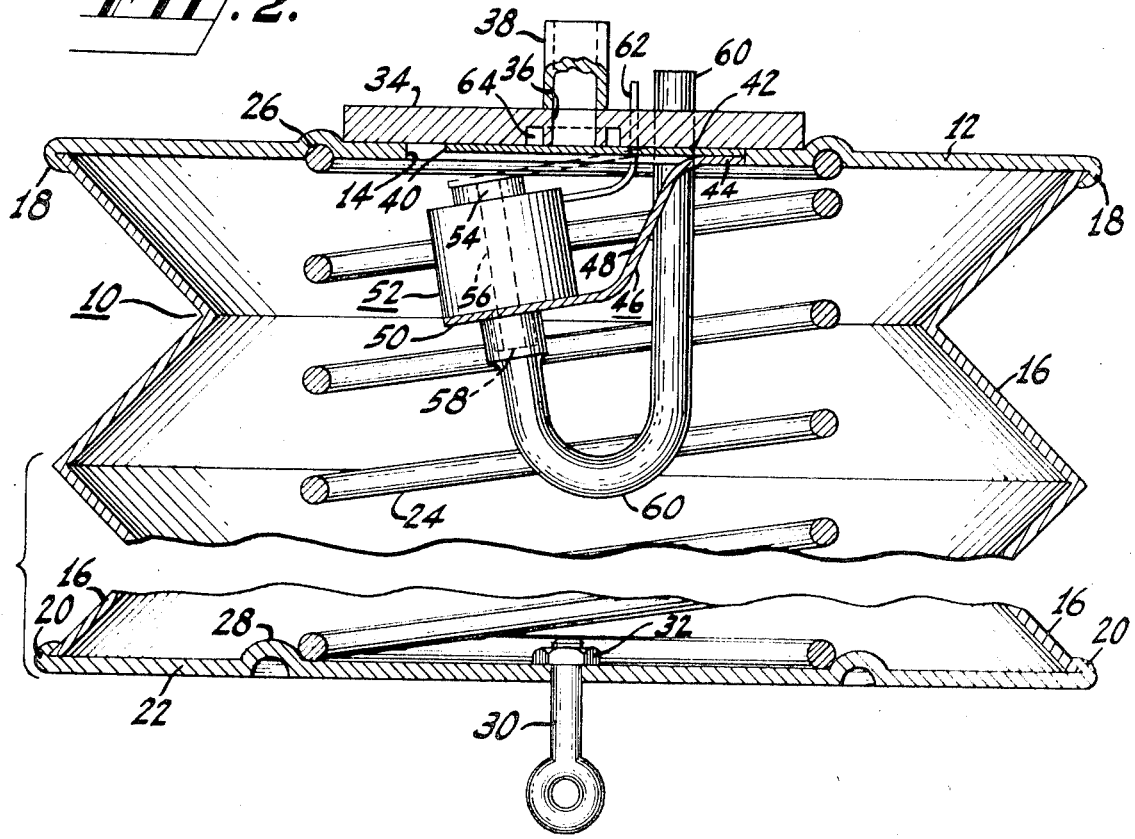
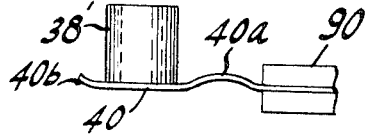
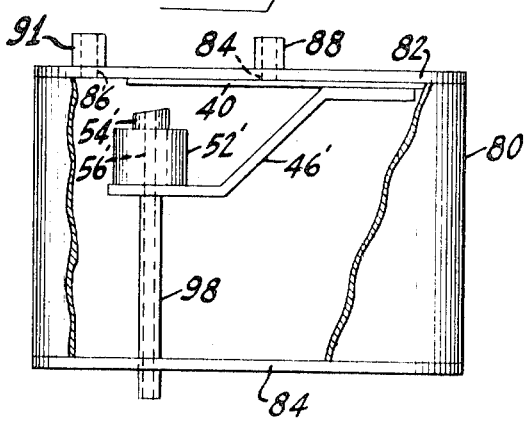

REED ARMATURE VALVES FOR CONTROLLING FLUID FLOW

This invention relates to a valve for controlling the flow of fluids.

A valve for controlling the flow of fluids comprises an orifice and a member which may be moved between orifice obstructing and nonobstructing positions. For high-speed operation of the valve, the moving member must be light to reduce inertia. A thin flat resilient reed of magnetic material which, due to its resilience, tends to move to an orifice closing position, and which under effects of a magnetic field may be flexed to uncover the orifice, is a suitable moving or valving member for a valve when considered from the inertia standpoint. However, a moving member comprising a thin flat reed may not be fully satisfactory as a valve member since the reed may bounce as it covers the orifice, preventing precise valve action of the valve.

It is an object of the present invention to provide a valve in which the tendency of the valving member to bounce is reduced whereby a more precisely operating valve is provided.

In accordance with the invention, an orifice member having a flat surface is provided. An orifice extends through the flat surface of the orifice member. An end of a resilient magnetic reed-type valve member is fixed to the flat surface in such a manner that a flat surface of the reed lies against the flat surface of the orifice member and a portion of the reed covers the orifice. The other end of the reed extends beyond the orifice in a direction away from the fixed end of the reed. Magnetic means are provided to attract the free end of the reed whereby in its motion the reed is peeled off the orifice member to nonobstructing position with respect to the orifice. If desired, the orifice may be relieved in the vicinity of the orifice to reduce the obstruction of the flow of fluid by the reed at small displacement thereof from its orifice closing positions. Also if desired, the pole piece of the magnet may be positioned so that the reed lies flat thereagainst when the reed has been flexed to the maximum extent, and further if desired, a hole which may extend either through the magnet or through an additional orifice member may be obstructed by the reed in its position of maximum deflection.

The invention may be better understood upon reading the following description in connection with the accompanying drawing in which:

FIG. 1 is a top view of a gas-operated bellows in which a valve, made in accordance with an embodiment of this invention, may be operatively positioned, FIG. 2 is a sectional view of the bellows, and of the valve that is positioned therein, of FIG. 1 on the line 1-1 thereof, FIG. 3 is a fragmentary sectional view of the valve on line 3-3 of FIG. 1, FIG. 4 is an elevational view of a modification of the valve of FIGS. 2 and 3, FIG. 5 is a diagrammatic showing that is useful in furthering the understanding of the disclosed valve, and FIG. 6 is an elevational view, partially broken away, of a two-way valve made in accordance with this invention.

Turning to FIGS. 1 and 2, a vacuumtight bellows 10 is provided. The bellows 10 comprises a round plate 12 having a round central hole 14 therethrough. The bellows 10 also comprises a cylindrical accordionlike member 16, the upper end of which as viewed in FIG. 1, is fixed to a flexible lip portion 18 which comprises the lower circumference of the plate 12. An intermediate portion of the accordionlike member 16 is broken away as illustrated in FIG. 2, for convenience of illustration. The lower end of the member 16 is fixed to a flexible lip portion 20 which comprises the upper circumference of a round lower plate member 22. A spring 24 urges the upper plate 12 and the lower plate 22 apart. The upper end of the spring 24 fits into a circular depression 26 formed in the lower surface of the upper plate 12 and the lower end of the spring 24 fits inside of a circular ridge 28 extending from the upper surface of the plate 22, whereby the spring 24 retains its operative position. An eyebolt 30 extends through the lower plate 22 and is threaded into a nut 32 which may be fixed in the plate 22. As will be understood, mechanical motions provided by the bellows 10 may be coupled to a workpiece, not shown, by attachment to the eyebolt 30.

The hole 14 in the plate 12 is closed in a hermetic manner by a round plate 34. An orifice 36 extends through a central portion of the plate 34. A tubule 38 is fixed to the plate 34 surrounding the orifice 36. A flat resilient, magnetic reed 40 extends along the lower flat surface of the plate 34 in such a manner that an intermediate portion of the reed 40 closes the orifice 36 when the reed 40 is flat. One end 42 of the reed 40 is clamped to the lower surface of the plate 34 as by an end portion 44 of a bracket 46 of magnetic material and generally S-shape. The intermediate portion 48 of the bracket 46 extends away from the plate 34. The other end 50 of the bracket 46 extends away from the plate 34 at a small acute angle. An electromagnet 52 is fixed to the end portions 50 and extends upwardly therefrom. An iron core 54 for the magnet 52 extends therethrough and a hole or orifice 56 is provided in the iron core 54, the hole 56 extending through the bracket portion 50 and also through a tubule 58 which extends below the bracket portion 50. An end of an air hose or tube 60 surrounds the tubule 58. The tube 60 extends outwardly of the bellows 10 and through the plate 34 to which it is sealed in a hermetic manner. The end of the tube 60 may be open to the air. An insulated wire 62, comprising a terminal for the electromagnet 52 also extends through the plate 34 in a hermetic manner. The other terminal of the magnet 62 is not shown since it may be grounded to the bracket 46 and therefore to the plates 34 and 12. The reed 40 is flat and resilient and in its normal position when the magnet 52 is not energized the reed 40 lies flat against the plate 34 and closes the orifice 36. The reed 40, upon energization of the magnet 52, will be attracted to the pole piece 54 to its position shown in dotted lines in FIG. 2 to open the orifice 36 and close the orifice 56.

The angle made by the bracket portion 50 with the plate 34 is so chosen as to permit the reed 40, when deflected, to lie flat on the end of the pole piece 54 as shown in dotted lines in FIG. 2, in such a manner as to close the orifice 56. The pole piece 54 is positioned in the vicinity of the free end of the reed 40 which extends beyond the orifice 36 from the clamped end 42.

The plate 34 is relieved near the orifice 36 as indicated by the reference character 64 in FIGS. 2 and 3. That is, the plate 34 is cut away to form passage ways 64 for air within and without the width of the reed 40 and around the narrow side edges of the reed 40 and into the orifice 36 even when the reed 40 is so flexed that the reed 40 acts as an obstruction to air flow into the orifice 36 from the inside of the bellows 10.

The valve of FIG. 4 differs from the valve of FIGS. 1, 2 and 3 only in that the end 50' of the bracket 46' is parallel to the plate 34. The top of the pole piece 54' of the magnet 52' is formed at an angle to the plate 34 to permit the reed 40 to lie flat against the top of the pole piece 54' of the magnet 52' and to close the orifice 56' when the reed 40 is fully flexed.

A two-way valve is shown in FIG. 6. A container 80 is provided having a top closure 82 and a bottom closure 84, as viewed in FIG. 6. The cover 82 has two orifices 84 and 86 therethrough. A reed 40 which lays flat against the bottom of the cover 82 covers the orifice 84. Tubules 88 and 91 communicate with the orifices 84 and 86 respectively. An electromagnet 52' is mounted on a bracket 46' which is itself mounted on the plate 82, the bracket 46' holding the reed 40 in place. An orifice 56' extends through the pole piece 54' of the magnet 52'. A tube 98 connects the orifice 98 to the outside of the container 80. Except for the orifices as described, the container 80 is airtight.

The general operation of the valve as used in a bellows 10 is now presented. When the magnet 52 is not energized, the orifice 36 is closed, that is the plate 40 lies flat against the under surface of the plate 34 blocking suction which is applied by means not shown to the tubule 38 from the interior of the bellows 16. It will be noted that the desired construction of the valve accommodates any position of the orifice 36 along the length of the reed 40 as long as the end of the orifice registers with a portion of the reed 40, and that any size or shape of orifice 36 may be provided as long as the orifice is closed by the reed 40 when it is in its flat position. Also flat reeds 40 of various thicknesses and widths may be used with the plate 34 as may be desired. At the time when the orifice 36 is closed and the orifice 56 is open, air enters the bellows 10 by way of the hose 60 and by way of the orifice 56 and the spring 24 expands the bellows 10 to its maximum extent, carrying with it whatever is fixed to the eyebolt 30.

When the magnet 52 is energized, the end of the reed 40 is attracted towards the pole piece 54. The reed 40 flexes as the free end thereof travels toward the pole piece 54 and the reed 40 frees the orifice 36 in a gradual peeling manner. Furthermore, as the reed 40 flexes due to the attraction of the magnet 52, the airgap between the magnet 52 and the flexed end of the reed 40 decreases faster than if the reed 40 did not flex, whereby less magnetic force is necessary to move the reed to its orifice opening position than if the reed did not flex. In this manner, smoother valving action is provided and less magnetic force is required to open the orifice 36 than if the reed were not flexed in this peeling manner. The relieved portions 64 (FIG. 3) facilitate flow of air around the sides of the reed 40.

Upon energization of the magnet 52, the reed 40 is attracted to its position shown in dotted lines where it lies flat against the pole piece 54 and closes the orifice 56. Suction applied to the tubule 38 now is applied to the inside of the bellows 10 causing it to contract, since the orifice 36 is open and the orifice 56 is closed, compressing the spring 24 and moving whatever is coupled to the eyebolt 30.

When the magnet 52 is deenergized the reed springs back to its flat position shown in solid lines, closing the orifice 36 and opening the orifice 56, allowing the bellows to expand. Since the movement of the reed 40 is stopped by the plate 34 along the whole length of the reed 40 when the reed is allowed to spring back to its flat configuration, no part of the reed can bow in an upward direction beyond the flat position whereby no energy is stored in the bowed portion of the reed and whereby the flat reed 40 does not bounce when it covers the orifice 36. Therefore, when the magnet 52 is deenergized, releasing the reed 40, the reed 40 covers the orifice 36 smoothly and completely and without bounce. While the showing of FIG. 5 is exaggerated for the purpose of clarity, it will be seen that where no flat plate 34 is provided to prevent such action, the reed of FIG. 5 is bowed upward as at 40a and 40b at the moment the reed hits the orifice member 38' of FIG. 5. The energy stored in the bowed portion 40a and 40b of the reed 40 causes bounce of the reed 40 to momentarily open the orifice in the orifice member 38' after it had been closed, resulting in improper valve action in the construction of FIG. 5. This improper valve closing of the orifice 36 is avoided by the valves illustrated in FIGS. 2, 3 and 6.

The two-way valve of FIG. 6 operates in a similar manner. If pressure is applied to the tubule 91 and the electromagnet 52' is not energized, pressure will appear in the tubule 98. If the magnet 52' is energized, will appear in the tubule 88.

What I claim is:

1. A reed valve comprising:
a plate having a flat surface, said plate having an orifice through said flat surface,
an elongated flat resilient magnetic reed,
means to fix an end portion of said reed to said flat surface of said plate in such a manner that substantially the full length of the flat surface of said reed lies contiguous with said plate surface providing support for substantially all of said surface of said reed to prevent undesirable bounce when said reed is flexed against said flat surface and in such a manner that said reed covers said orifice when said reed is contiguous with said flat surface, and
means including an electromagnet for flexing said reed away from said flat plate surface at one end of said reed whereby said reed when released returns to the unflexed condition without substantial bounce which might otherwise occur.

2. A reed valve comprising:
a plate having a flat surface, said plate having an orifice through said flat surface,
an elongated flat resilient magnetic reed,
means to fix an end portion of said reed to said flat surface of said plate in such a manner that substantially the full length of the flat surface of said reed lies contiguous with said plate surface providing support for substantially all of said surface of said reed to prevent undesirable bounce when said reed is flexed against said flat surface and in such a manner that said reed covers said orifice when said reed is contiguous with said flat surface, the other end of said reed extending beyond said orifice from said fixed end, and
means including an electromagnet for flexing said reed away from said flat plate surface by attracting said other end of said reed,
whereby upon energization of said electromagnet, said reed is peeled away from said plate.

3. A reed valve comprising:
a plate having a flat surface, said plate having an orifice through said flat surface,
an elongated flat resilient reed,
means to fix an end portion of said reed to said flat surface of said plate in such a manner that substantially the full length of the flat surface of said reed lies contiguous with said plate surface providing support for substantially all of said surface of said reed to prevent undesirable bounce when said reed is flexed against said flat surface and in such a manner that said reed covers said orifice when said reed is contiguous with said flat surface,
means to flex said reed away from said flat plate surface at one end of said reed whereby said reed when released returns to the unflexed condition without substantial bounce which might otherwise occur, and
an orifice member having an orifice formed therein so positioned that the orifice formed in said orifice member is closed by said reed when said reed is flexed.

4. A reed valve comprising:
a plate having a flat surface, said plate having an orifice through said flat surface,
an elongated flat resilient magnetic reed,
means to fix an end portion of said reed to said flat surface of said plate in such a manner that substantially the full length of the flat surface of said reed lies contiguous with said plate surface providing support for substantially all of said surface of said reed to prevent undesirable bounce when said reed is flexed against said flat surface and in such a manner that said reed covers said orifice when said reed is contiguous with said flat surface,
means including a magnet for flexing said reed away from said flat plate surface at one end of said reed, and
another orifice member having an orifice therein, said other orifice member being positioned so that said reed closes the orifice in said other orifice member when said reed is flexed.

5. A reed valve comprising:
a plate having a flat surface, said plate having an orifice through said flat surface,
an elongated flat resilient magnetic reed,
means to fix an end portion of said reed to said flat surface of said plate in such a manner that substantially the full length of the flat surface of said reed lies contiguous with said plate surface providing support for substantially all of said surface of said reed to prevent undesirable bounce when said reed is flexed against said flat surface and in such a manner that said reed covers said orifice when said reed is contiguous with said flat surface, and
means including an electromagnet for flexing said reed away from said flat plate surface at one end of said reed, said electromagnetic means including a magnetic core in which core an orifice is formed, said core orifice being so formed and positioned such that said reed closes said core orifice when said reed is flexed.

6. A reed valve comprising:

a plate having a flat surface, said plate having an orifice through said flat surface, an elongated flat resilient magnetic reed, means to fix an end portion of said reed to said flat surface of said plate in such a manner that substantially the full length of the flat surface of said reed lies contiguous with said plate surface providing support for substantially all of said surface of said reed to prevent undesirable bounce when said reed is flexed against said flat surface and in such a manner that said reed covers said orifice when said reed is contiguous with said flat surface, and means including an electromagnet for flexing said reed away from said flat plate surface, said orifice being positioned at a point along said reed which is intermediate the fixed end and a free end of said reed, said electromagnet being positioned to attract a portion of said reed beyond the orifice from the fixed end of the reed.

7. A reed valve comprising:

a plate having a flat surface, said plate having an orifice through said flat surface, an elongated flat resilient reed, means to fix an end portion of said reed to said flat surface of said plate in such a manner that substantially the full length of the flat surface of said reed lies contiguous with said plate surface providing support for substantially all of said surface of said reed to prevent undesirable bounce when said reed is flexed against said flat surface and in such a manner that said reed covers said orifice when said reed is contiguous with said flat surface, and means to flex said reed away from said flat plate surface at one end of said reed whereby said reed when released returns to the unflexed condition without substantial bounce which might otherwise occur, said reed being wider than said orifice and said plate being relieved at the sides of the orifice within and without the width of the reed.

8. A reed valve comprising:

a plate having a flat surface, said plate having an orifice through said flat surface, an elongated flat resilient magnetic reed, means to fix an end portion of said reed to said flat surface of said plate in such a manner that substantially the full length of said reed lies along said flat surface and in such a manner that said reed covers said orifice, and electromagnetic means to flex said reed away from said surface whereby said orifice is opened, said magnetic means having a magnetic core and in which core an orifice is formed and in which means said core and said last-mentioned orifice are so formed and positioned that said reed closes said last-mentioned orifice when said reed is flexed.